US007437050B2

(12) United States Patent
Bourdin et al.

(10) Patent No.: US 7,437,050 B2

(45) Date of Patent: Oct. 14, 2008

(54) LIGHTING AND/OR SIGNALLING DEVICE WITH OPTICAL GUIDE FOR A MOTOR VEHICLE

(75) Inventors: David Bourdin, Bobigny (FR); Antoine De Lamberterie, Bobigny (FR)

(73) Assignee: Valeo Vision, Bobigny (FR)

( * ) Notice: Subject to any disclaimer, the term of this patent is extended or adjusted under 35 U.S.C. 154(b) by 0 days.

(21) Appl. No.: 11/150,784

(22) Filed: Jun. 10, 2005

(65) Prior Publication Data

US 2005/0276565 A1 Dec. 15, 2005

(30) Foreign Application Priority Data

Jun. 11, 2004 (FR) .................................. 04 06375
Jun. 11, 2004 (FR) .................................. 04 06376

(51) Int. Cl.
*G02B 6/10* (2006.01)
*G02B 6/00* (2006.01)
*F21V 7/04* (2006.01)

(52) U.S. Cl. .......................... 385/146; 385/123; 362/31

(58) Field of Classification Search ................. 362/331, 362/339, 620, 626; 385/146, 901
See application file for complete search history.

(56) References Cited

U.S. PATENT DOCUMENTS 4,450,509 A * 5/1984 Henry ........................ 362/216
5,506,929 A 4/1996 Tai et al. ...................... 385/146
5,719,649 A * 2/1998 Shono et al. .................. 349/65
5,835,661 A 11/1998 Tai et al. ...................... 385/146
6,097,549 A 8/2000 Jenkins et al. .............. 359/726
6,107,916 A 8/2000 Beck et al. .................. 340/468
6,217,184 B1 * 4/2001 Koike et al. ................. 362/606
6,222,689 B1 4/2001 Higuchi et al. .............. 359/837
6,540,382 B1 * 4/2003 Simon ........................ 362/339
6,633,722 B1 * 10/2003 Kohara et al. ............... 385/146
6,679,613 B2 * 1/2004 Mabuchi ..................... 362/600
2003/0117792 A1 * 6/2003 Kunimochi et al. ........... 362/31
2003/0161606 A1 * 8/2003 Goto et al. .................. 385/146
2003/0227768 A1 * 12/2003 Hara et al. ..................... 362/31
2004/0080835 A1 * 4/2004 Chinniah et al. ............ 359/708

FOREIGN PATENT DOCUMENTS

EP 0935091 8/1999
EP 0945674 9/1999
EP 1491815 12/2004
WO 99/09349 2/1999

OTHER PUBLICATIONS

French Search Report dated Jan. 12, 2005.
French Search Report dated Jan. 21, 2005.

* cited by examiner

*Primary Examiner*—Tina M Wong
(74) *Attorney, Agent, or Firm*—Morgan & Finnegan LLP

(57) ABSTRACT

The invention concerns a lighting and/or signalling device for a motor vehicle comprising at least one light source emitting a light beam and at least one optical guide in which the light beam propagates, said optical guide comprising an output face for the light beam, and another reflection face, opposite to the output face, having a serrated profile forming a reflection face for the light beam, notably comprising a series of prisms, each prism forming, with the following prism (8), a bottom angle (D). At least one bottom angle of the reflection face is truncated, and/or in that the output face has a profile comprising flutes.

21 Claims, 3 Drawing Sheets

LIGHTING AND/OR SIGNALLING DEVICE WITH OPTICAL GUIDE FOR A MOTOR VEHICLE

BACKGROUND OF THE INVENTION

The object of the present invention is a lighting and/or signalling device equipping a motor vehicle, comprising at least one optical guide capable of producing a homogeneous diffusion of the light. This optical guide comprises prisms which make it possible to deviate the light rays.

The invention finds applications in the field of vehicles travelling on roads and, in particular, motor vehicles.

In the field of motor vehicle lighting and signalling, various types of device are known, amongst which there are found essentially: lighting devices situated at the front of the vehicle with, in particular, vehicle headlights equipped with dipped or low-beam headlights, having a range on the road close to 110 meters, and full-beam headlights having a long illumination range and producing an area of vision on the road close to 200 meters; lighting devices situated at the rear of the vehicle with, in particular, reversing lights; signalling devices situated at the front of the vehicle with, in particular, sidelights, direction indicators and D.R.L.s (Daytime Running Lights) (integrated or not with the headlights taking on the lighting functions mentioned above); and—signalling devices situated at the rear of the vehicle with, in particular, fog lights, rear lights, direction indicators and stop lights.

At present, use is known, in lighting devices or signalling devices, of one or more optical guides for propagating a light beam. An example of a vehicle headlight is described in the document U.S. Pat. No. 6,107,916. This headlight comprises a light source and an optical guide, placed in proximity to the light source and propagating the light beam emitted by this light source. This light guide can run along all or part of the glass or reflector of the headlight.

An example of a headlight is depicted in FIG. 1. More precisely, FIG. 1 depicts schematically the left-hand headlight of a vehicle. This headlight emits a light beam directed essentially towards the front of the vehicle, that is to say along the axis Y of the road. This headlight 1 comprises a protective glass 2 forming the output face of the headlight 1. It also comprises: a light source 3, emitting a light beam whose emission direction is depicted by an arrow 4; and an optical guide 5, propagating said light beam 4.

The optical guide 5 is a cylinder of transparent material provided with prisms, which provides the propagation of the light beam 4 from an end e1 close to the light source 3 to an end e2 opposite to the end e1. This optical guide 5 can have different geometrical shapes. It can, for example, form a circle, an arc of a circle or else be rectilinear. In the case of FIG. 1, the optical guide 5 follows the shape of the protective glass 2 of the headlight 1.

An example of the optical guide 5 of this headlight is depicted in more detail in the FIG. 2. This FIG. 2 shows a sectional view of the optical guide 5. This optical guide 5 comprises two faces: a first face 6 constituting an output face for the light rays propagated in the optical guide 5; this output face 6 is smooth and continuous; and—a second face 7, opposite to the first face 6 and constituting a reflection face of the optical guide; this reflection face 7 has a serrated profile, that is to say a profile in the shape of sawteeth. This reflection face 7 comprises a series of identical and symmetrical prisms 8. These prisms 8, placed side by side, form the sawteeth of the reflection face 7.

In FIG. 2, the optical guide 5 is depicted in a sectional view. For a better understanding of the figure, it is depicted hatched in FIG. 2. Thus, according to the sectional view of FIG. 2, each prism 8 has a substantially triangular shape. More precisely, each prism 8 has the shape of a triangle comprising a base 14, a facet 9 and a facet 10, these being plane and non-parallel. These facets 9 and 10 form between them an angle A, referred to as the angle of the prism. The facets 9 and 10 form, with the axis X of the optical guide 5, respectively, angles B and C. The facet 9 of a prism and the facet 10 of a consecutive prism together form a bottom angle D. The bottom angle D of each prism is in contact with a curve referred to as the bottom line 11. This bottom line 11 connects the vertex of all the angles D of the reflection face 6 of the optical guide 5. In other words, if it is considered that each prism 8 is a triangle, in its cross-section, the bottom line 11 connects the base 14 of each triangle with the base of the consecutive triangle.

It will be understood that the shape of each prism is considered as triangular in a 2-dimensional view.

FIG. 2 depicts, by means of arrows 12 and 13, an example of a path of a light ray propagating in an optical guide of the type of that described in the document U.S. Pat. No. 6,107,916. This light ray can be one of the light rays contained in the light beam 4 emitted by the light source 3. In this example, the light ray propagates in the optical guide 5 along a rectilinear initial path 12 until it encounters a facet of a prism. This path 12 forms, with the axis X of the optical guide 5, an angle of incidence E. When a light ray encounters a facet of a prism, for example the facet 10 of a prism 8 in the case of FIG. 2, the path 12 of the light ray is deviated by an angle F with respect to the initial path 12. The deviated path of the light ray is referenced 13. The deviation angle F between the path 12 and the path 13 is variable since it is related in particular to the angles of the prisms. Thus, the light ray is redirected, by the prisms 8 of the reflection face 7, towards the output face 6 of the optical guide 5.

In the example of FIG. 2, and for the purpose of simplifying this figure, the path of a single light ray has been depicted. It must be understood that other light rays with other paths can propagate in the optical guide, these rays possibly having been reflected one or more times, by one or more prisms or by the other face of the optical guide, before reaching a prism which redirects it towards the output face 6.

In the example of FIG. 2, the deviation 13 of the light ray corresponds to the principle of total reflection in an optical guide. The principle of total reflection is an optical phenomenon which allows the transmission of light in an optical guide 5. When a light ray passes from one medium to another medium having a different refractive index, its direction is changed; this is the effect of refraction. For a certain angle of incidence, and if the index of the initial medium is higher than that of the final medium, the light ray 12 is no longer refracted, it is totally reflected: total reflection is spoken of.

Thus, if FIG. 1 is considered again, it can be understood that the light beam 4 must be distributed over the entire length of the optical guide, that is to say between the end e1 and the end e2. However, some of the light beam 4 is lost, with constant prisms, since the flux which passes through the cross-section decreases as it propagates. It can therefore be understood that, at the end e2 of the optical guide 5, the amount of light lost is greater than at the end e1, close to the light source 3. In other words, the light throughput is lower at the end e2 than at the end e1 of the optical guide, the consequence of which is that a natural decrease occurs in the emitted light flux along the optical guide. Now, this decrease is visible to any person situated outside the vehicle.

Furthermore, in the example of FIG. 2, for an angle of incidence E between 0 and 5 degrees, the light ray undergoes total reflection. Thus, a light ray touching one of the facets 9 or 10 of the prism 8 is reflected towards the output face 6 of the optical guide 5, by the principle of total reflection.

In other words, light rays which arrive with an angle non-parallel to the axis X of the guide and, in particular, when they form an angle of 0° to 5° with this axis, are redirected towards the output face 6 of the optical guide by means of the prisms 8. The presence of the prisms 8 on the reflection face 7 of the optical guide 5 therefore makes it possible to make the light leave in the correct direction. By the principle of total reflection, the light ray is reflected towards the output face of the optical guide. In particular, it is reflected with a direction substantially perpendicular to the axis X of the optical guide 5, that is to say along the normal N to the axis X. Another direction of reflection of the light ray can be obtained by modifying the angle B and/or the angle C of the prism. In this case, if the angle between the ray leaving the optical guide and the normal N is referred to as G, then this angle G can only be positive. In other words, by modifying the slope of the prisms, it is possible to redirect the outgoing light rays so as to have a non-zero angle G.

However, in certain cases, it is advantageous to be able to send the light rays in a direction forming a negative angle G with the normal N. For example, in the case of FIG. 1, it can be seen that the optical guide 5 follows the profile of the protective glass 2 of the headlight 1. Consequently, the reflected light rays shine on the sides of the vehicle, in a direction Z. As can be understood in the view of FIG. 1, the light beam 4 emitted by the light source 3 propagates in the optical guide 5 to its opposite end e2. In proximity to this end e2, the light rays emitted perpendicular to the axis of the optical guide shine on the road laterally, and are seen by any observer on the side of the road. Thus, at this end e2 of the optical guide 5, the angle between the optical guide 5 and the desired direction of the light rays Y is not favourable. These light rays are lost, that is to say they are reflected towards a disadvantageous direction, which reduces the hoped-for performance of the lighting or signalling device.

BRIEF SUMMARY OF THE INVENTION

The aim of the invention is to remedy the drawbacks of the techniques described previously. The aim of the invention is in particular to improve the performance of the light guides, in particular to improve their visual appearance in the illuminated state and/or obtain greater flexibility in the choice of output angle of the light rays emitted by the light guide. Its aim is thus to improve/better control the emission of light by lighting and/or signalling devices using light guides, in particular to improve the homogenisation of the light distributed/emitted by these guides.

According to a first implementation, it proposes first of all a lighting and/or signalling device with optical guide, in which the light is distributed in a uniform and homogeneous manner along the optical guide. For this, the invention proposes an optical guide comprising a reflection face provided with a series of prisms, the angles situated between two consecutive prisms of the reflection face being, at least for some of them, truncated. Alternatively or in combination, the output face has a profile comprising flutes, a configuration detailed later.

More precisely, the invention concerns first of all a lighting or signalling device for a motor vehicle comprising at least one light source emitting a light beam and at least one optical guide in which the light beam propagates, said optical guide comprising—a face, referred to as the output face for the light beam, and—another face, referred to as the reflection face, opposite to the output face, having a serrated profile forming a reflection face for the light beam and comprising a series of prisms, each prism forming, with the following prism, a bottom angle, with at least one bottom angle of the reflection face which is truncated.

The term "prism" is relative to a geometric shape defined with smooth, plane faces. However, it remains within the scope of this patent to have assimilated prisms, one face of which at least that is not complexly plane and that can be curved to a certain extent for instance.

The invention, according to this first implementation, can comprise one or more of the following characteristics: at least some of the bottom angles of the reflection face comprise a truncated area, the size of the truncated area being variable from one angle to another. Such a truncated area makes it possible to modulate and control the throughput of each prism, that is to say the flux outgoing locally from a prism compared with the total flux passing through the cross-section of the guide at the level of this prism, and to optimise the homogeneous appearance of the light emitted by the optical guide throughout its length; the size of the truncated areas decreases as the distance from the light source increases; the reflection face comprises both prisms with a truncated bottom angle and prisms with a non-truncated bottom angle;

according to a first variant, the prisms have variable pitches and a constant height, which makes it possible to modulate the throughput of each prism whilst modulating the visual effect;

according to a second variant (which can be combined with the preceding one), the prisms have a constant pitch and variable heights, which also makes it possible to modulate the throughput of each prism, with an implementation which is simple to carry out; the pitch of the prisms has a size of the order of 0.2 to 2 mm;—the height of the prisms is of the order of 0.2 to 2 mm; the prisms (or at least one of them) of the reflection face are symmetrical. This embodiment is preferable when the device comprises several light sources (in particular one at each end of the guide); the prisms (or at least one of them) of the reflection face are dissymmetrical, which allows a better throughput of the prisms, and is also preferable when a single light source is used to supply the guide.

According to a second implementation, alternative to or in combination with the preceding one, the invention proposes a lighting and/or signalling device in which the optical guide comprises a reflection face with a serrated profile and an output face with a fluted profile. Such an output face has the advantage of straightening by an additional angle the light rays reflected by the reflection face, so as to obtain light rays leaving the optical guide with a negative angle with respect to the normal to the axis X (the negative sign being understood with respect to the mean direction of propagation of the light in the guide), which offers great flexibility in the choice of output angles for the light rays leaving the optical guide.

More precisely, the invention according to this second implementation concerns a lighting and/or signalling device for a vehicle comprising at least one light source emitting a light beam and an optical guide capable of propagating said light beam, said optical guide comprising: a serrated face, referred to as the reflection face and comprising a series of prisms, and—another face, opposite to the first face, forming an output face for the light beam, such that the output face has a profile comprising flutes. The term "serrated" indicates that the said profile defines a non-plane, non-smooth surface. Such a device makes it possible to deviate in a controlled manner the rays coming from the prisms. The lighting and/or signalling device according to the second implementation of the invention can comprise one or more of the following characteristics: each flute of the output face is situated opposite a prism of the reflection face, which makes it possible to collect the rays of interest which have been reflected by the prism with which it is associated; the flutes of the output face each have (for at least one of them at least) a curved shape, in particular in an arc of a circle, which makes it possible to implement a variable deviation of a light ray coming from the same prism, which creates a spreading of the light rays, and therefore a homogenisation of the illuminated appearance of the optical guide in all directions; the flutes (for at least one of them at least) each have the shape of a prism with plane facets. This embodiment is simple to implement and makes it possible, optically, to give greater importance to one direction of emission of the light rays; each (at least one) prism is symmetrical. This embodiment is preferable when the device comprises several light sources; each (at least one) prism is dissymmetrical, which allows a better throughput of the prisms, the throughput being understood as the light flux outgoing locally from a prism compared with the total flux passing through the cross-section of the guide at the level of this prism; the flutes (for at least one of them at least) each comprise a facet in an arc of a circle and a plane facet. This embodiment makes it possible to combine the advantages of the two preceding embodiments (arc of a circle shape and prism shape). Moreover, it makes it possible to limit the disturbances as regards the rays which continue their propagation in the optical guide; the flutes (for at least two of them at least) of the output face are contiguous; the flutes (for at least two of them at least) of the output face are non-contiguous; each flute (for at least one of them at least) comprises a flute angle, with respect to an axis of the optical guide, of the order of 10 to 30°, preferably 5° to 20°; where the prisms of the output face each comprise a first facet and a second facet, the second facet forming a bottom angle with the first facet of a consecutive prism, at least some of the prisms of the reflection face comprise a truncated bottom angle. Such a truncated bottom angle makes it possible to modulate and control the throughput of each prism, that is to say the flux outgoing locally from a prism compared with the total flux passing through the cross-section of the prism, and to optimise the homogeneous appearance of the optical guide.

According to both the first and the second implementation: the light sources can be of the halogen type, be light-emitting diodes, or any other lamp such as xenon lamps for example; the lighting or signalling device can comprise at least two light sources each placed at one end of the optical guide (standard light sources of halogen type or light-emitting diodes for example): the optical guide can then propagate the light from both ends, which makes it possible to have long light guides; the lighting or signalling device can comprise several optical guides having a common intersection, at least one light source being situated at this intersection point. This then gives a "branched" light guide, with preferably a source at branch level, and possibly at least one of the ends of the arms of such a guide.

The invention also concerns a motor vehicle equipped with at least one lighting or signalling device according to this first implementation and/or this second implementation of the invtention, as well as the light guide in itself.

BRIEF DESCRIPTION OF THE DRAWINGS

FIGS. 1 to 5 concern more specifically the invention according to the first implementation.

FIGS. 7 to 9 concern more specifically the invention according to the second implementation.

FIG. 6 concerns more specifically the invention combining the first and second implementations according to the invention.

DETAILED DESCRIPTION OF EMBODIMENTS OF THE INVENTION

The invention will be described hereinafter with the help of two examples, and, in both cases, concerns a lighting or signalling device with optical guide allowing a homogeneous and uniform diffusion of the light. The device of the invention can be a headlight like that of FIG. 1 or else a signalling device. Whether it is a headlight or a signalling device, the optical guide comprises characteristics providing the light at the output of the optical guide with a homogeneous and uniform appearance. In the remainder of the description, a headlight will be described, it being understood that it can also be a signalling device.

Figure 1:
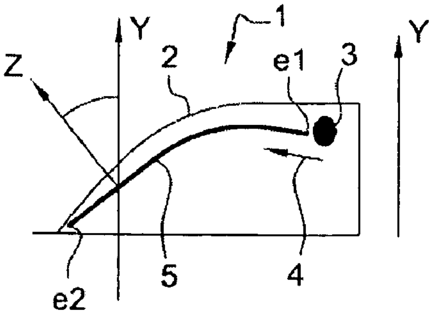
FIG. 1, already described, depicts an example of a vehicle headlight provided with an optical guide.
Figure 2:
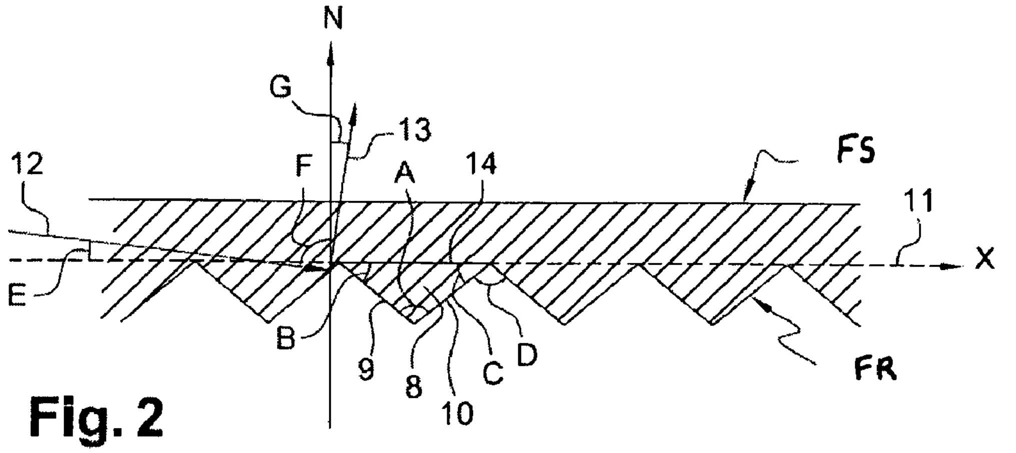
FIG. 2, already described, depicts a sectional view of an optical guide of the prior art.
Figure 3:
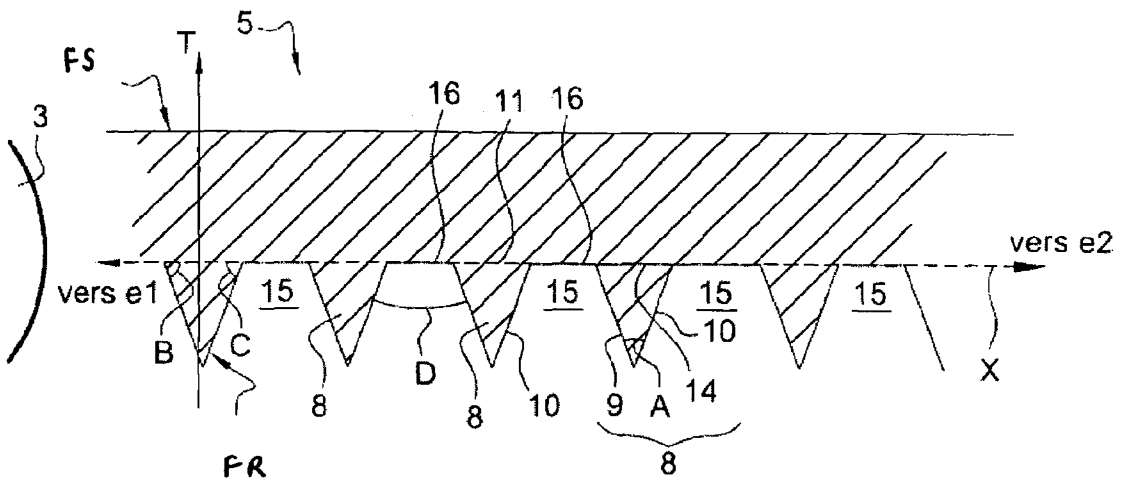
FIG. 3 depicts a sectional view of an example of an optical guide with truncation, according to the invention.

According to the first implementation, an example of an optical guide according to the invention, capable of being mounted in a headlight of FIG. 1, is depicted in FIG. 3. In the example which will be described, the lighting device considered is a sidelight situated in a headlight at the front of a vehicle. Also, the optical guide, in this example, is curved and forms a circle or an arc of a circle. It must be understood that the optical guide, according to the invention, can have other shapes such as, for example, rectilinear, curved with one or more curvatures, etc.

FIG. 3 shows a sectional view of an optical guide 5 intended to propagate a light beam emitted by the light source 3. In this embodiment, the optical guide 5 has a circular cross-section; it must be understood that it can also, in other embodiments, have an elliptic, square, oval, perhaps even square, etc. cross-section.

This optical guide 5 comprises two faces: a first face FS constituting an output face for the light rays propagated in the optical guide 5; this output, face 6 can be smooth and continuous, as in FIGS. 3 to 5, or else comprise flutes, as shown later in FIG. 6; a second face FR, opposite to the first face FS, constituting a reflection face of the optical guide 5; this reflection face FR comprises a series of prisms 8. These prisms 8 are placed side by side and provide reflection of the light rays having a non-zero angle of incidence with the axis X of the optical guide 5.

According to a sectional view of the optical guide 5, each prism 8 has a substantially triangular shape; each prism comprises a base 14, a facet 9 and a facet 10, these being plane and non-parallel. The facet 9 and the facet 10 of a prism 8 can be symmetrical with respect to an axis T perpendicular to the axis X of the optical guide, that is to say they have identical sizes and angles B and C, either side of the bisecting line T. It is then said that the optical guide is a symmetrical-prism optical guide. The facet 9 and the facet 10 can also be asymmetrical, that is to say they have sizes and/or angles B and C which are different. It is then said that the optical guide is a dissymmetrical-prism optical guide.

The facet 10 of a prism 8 and the facet 9 of a consecutive prism together form a bottom angle D. According to the invention, the bottom angle D of a prism 8 is truncated. In other words, at least some of the bottom angles D comprise a truncated area. This truncated area of the bottom angle D forms a flat surface 16. A flat surface 16 is therefore a flat part of the bottom line curve 11 depicted in dotted lines in FIG. 3. In the example of FIG. 3, the bottom line 11 is coincident with the axis X of the optical guide 5.

Everything occurs as if the space situated between two prisms 8 formed an air prism 15: there is then, in the invention, the "clipped" air prism 15. In this case, the clipping of the air prisms 15 is implemented along a cross-section of the vertices of said air prisms. This cross-section is implemented along the curve of the bottom line 11.

As will be seen more precisely subsequently, the flat surfaces 16 of the bottom angles D preferably have a right-angled geometric shape. They can have different sizes. These sizes of the flat surfaces can vary from one optical guide to another. They can also be variable within the same optical guide. In this case, the flat surfaces 16 can have different sizes for each bottom angle D associated with each prism. Some bottom angles D can also not comprise a flat surface 16. In this case, the optical guide 5 comprises both bottom angles D with flat surfaces 16 and bottom angles D with no flat surface, for example alternately. For example, the size of the flat surfaces can be chosen decreasing from the end e1 towards the end e2 of the optical guide in order to propagate a maximum number of light rays towards the end e2.

According to the invention, the bottom angle D between two prisms 8 is truncated, which allows a light ray to propagate in the optical guide 5 without touching one of the facets 9 or 10 of the prism. Therefore, the light ray is reflected by the flat surface towards the output face FS so as to be totally reflected thereby. It then continues its propagation in the optical guide.

For example, in proximity to the end e1 of the optical guide, a large part of the light rays emitted by the light source 3 are not reflected, on account of the fact that they do not encounter prism facets 9 or 10. These light rays continue their propagation in the optical guide 5 as if there were no prism. These light rays are thus directed towards the end e2 of the optical guide 5. The properties of the reflection face FR are therefore modified by the presence of these flat surfaces. In this way, between the ends e1 and e2 of the optical guide 5, the light flux leaving the optical guide can be distributed uniformly over the entire length of the optical guide by this flat surface phenomenon.

The invention also make it possible to obtain, at the output of the optical guide, light flux intentionally distributed non-uniformly. In this case, the non-uniform distribution is controlled in order to obtain a particular visual effect, for example an alternation of illuminated areas and non-illuminated areas.

Thus, the bottom angles D make it possible to adjust the contribution of light from the prisms 8 in the optical guide 5. It can then be understood that an optical guide 5 according to the invention makes it possible to compensate for the reduction in the light flux passing through the optical guide between the end e1 and the end e2.

The uniform, or non-uniform but controlled, distribution of the light flux is, preferably, obtained by means of variable flat surface sizes and, more precisely, the variable width of the flat surfaces along the axis X. In a preferred embodiment, the size of the flat surfaces 16 decreases from the end e1 towards the end e2 of the optical guide 5. This reduction in size of the flat surfaces 16 makes it possible to optimise the guidance of the light rays propagating in the optical guide 5. In proximity to the end e1, the size of the flat surfaces 16 is large, thus allowing a large part of the light rays to not encounter a prism facet 9 or 10 and thus to continue their propagation towards the end e2. In proximity to the end e2, the size of the flat surfaces 16 is increasingly small until it is zero. There are then a great many light rays which encounter one of the facets 9 or 10 of a prism. These light rays are then reflected towards the output face FS of the optical guide 5.

This reduction in the size of the flat surfaces 16 makes it possible to compensate for the natural light decrease and, consequently, to make the luminance (that is to say the light intensity emitted per $m^2$) uniform in a controlled manner at any point of the optical guide 5. Therefore, the optical guide 5, in its entirety, has a homogeneous appearance.

In other embodiments, the size of the flat surfaces can increase from the end e1 towards the end e2, or else bottom angles with a flat surface can alternate with bottom angles with no flat surface, etc.

Figure 4:
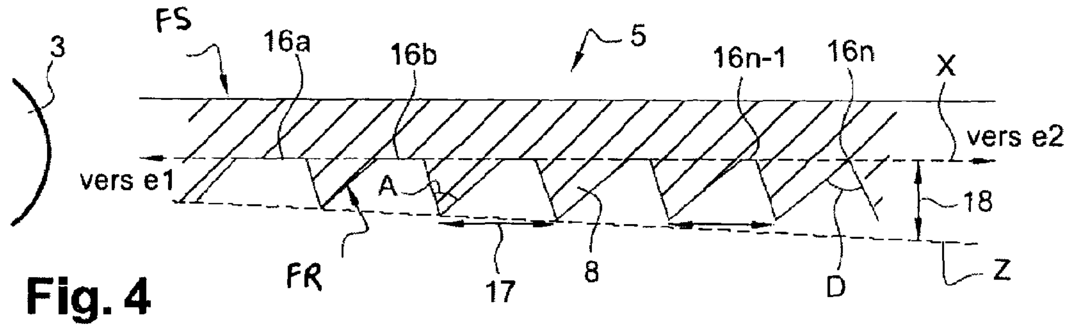
FIG. 4 depicts a sectional view of a first embodiment of an optical guide with variable truncation according to the invention.

FIG. 4 shows a first embodiment of an optical guide with variable truncation, that is to say one in which the size of the flat surfaces is variable. In the example of FIG. 4, the flat surfaces 16 have decreasing sizes between the end e1 and the end e2 of the optical guide 5, as explained previously. As can be seen in the sectional view of the optical guide 5 of FIG. 4, the flat surfaces 16*a*, 16*b*, . . . 16*n* have sizes different from one another and, more precisely, decreasing sizes. This decrease is obtained by modulating the height of the prisms. More precisely, in the example of FIG. 4: the pitch 17 between two prisms is constant. "Pitch" 17 means the length connecting the vertex of a prism with the vertex of the consecutive prism. The pitch 17 is depicted by a double arrow in FIG. 4. In other words, the pitch 17 corresponds to the base of the air prism 15. The pitch 17 between two prisms is preferably of the order of 0.2 to 2 millimeters; the height 18 of the prisms 8 is variable. "Height" 18 refers to the distance between a point on a curve Z and a point on the bottom line 11 of the optical guide 5. The curve Z, depicted in dotted lines in FIG. 4, is a curve connecting the vertices of the angles A of each prism. The height 18 is depicted by a double arrow in FIG. 4. Preferably, the height 18 is of the order of 0.2 to 2 millimeters.

In the embodiment of FIG. 4, the height 18 of a prism 8 increases proportionally to the reduction in size of the corresponding flat surface 16. The reflection face FR is contained between two curves, along the optical guide. One of the curves is the bottom line 11 and the other curve is the curve Z.

Figure 5:
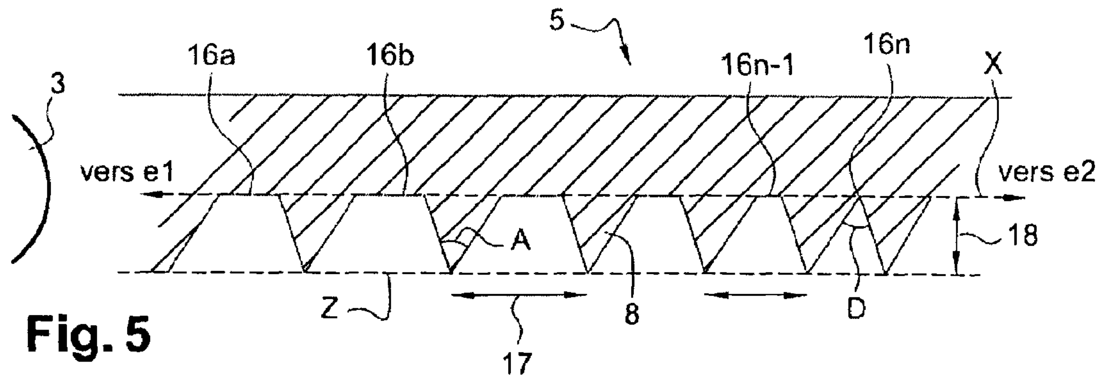
FIG. 5 depicts a sectional view of a second embodiment of an optical guide with variable truncation according to the invention.

FIG. 5 shows a second embodiment of an optical guide 5 with variable truncation. As in the case of FIG. 4, the flat surfaces 16 have decreasing sizes between the end e1 and the end e2 of the optical guide 5. As can be seen in the sectional view of the optical guide 5 of FIG. 5, the flat surfaces 16*a*, 16*b*, . . . 16*n* have decreasing sizes. In this embodiment, the decrease is obtained by modulating the pitch of the prisms. More precisely, in the example of FIG. 5: the pitch 17 between two prisms is variable. The pitch 17 is depicted by a double arrow in FIG. 5. The pitch 17 between two prisms is preferably less than or equal to 2.5 mm, in particular of the order of 0.2 to 2 millimeters; the height 18 of the prisms 8 is constant. The height 18 is depicted by a double arrow in FIG. 5. The height 18 is less than or equal to 2.5 mm, in particular of the order of 0.2 to 2 millimeters. In this embodiment, the pitch 17 of a prism 8 decreases proportionally to the reduction in size of the corresponding flat surface 16. The height 18 being constant, the curve Z is parallel to the axis X of the optical guide 5.

The two embodiments which have just been described both make it possible to implement a decrease in the size of the flat surfaces. In addition, they offer the same light throughput and the same homogeneity of the light emitted by the optical guide 5 over its entire length. The choice of one or other of these embodiments depends on the visual, perhaps even aesthetic, appearance desired.

Figure 7:
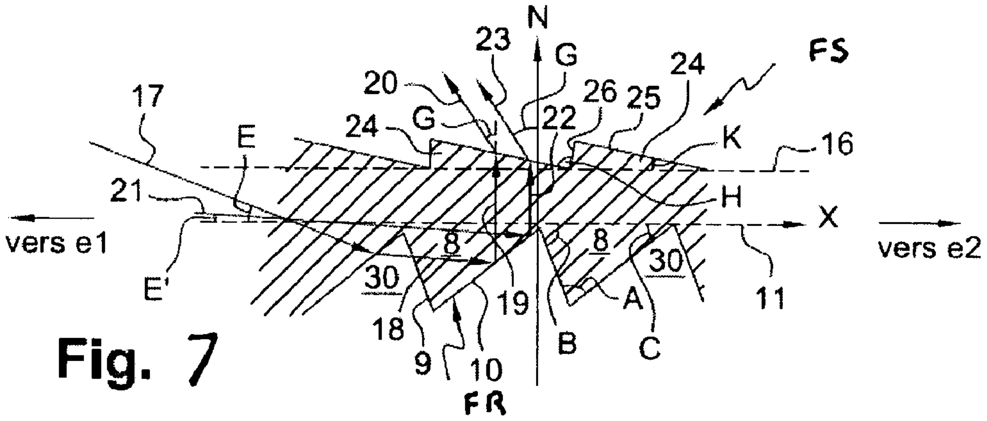
FIG. 7 depicts a first embodiment of an optical guide according to the invention.
Figure 8:
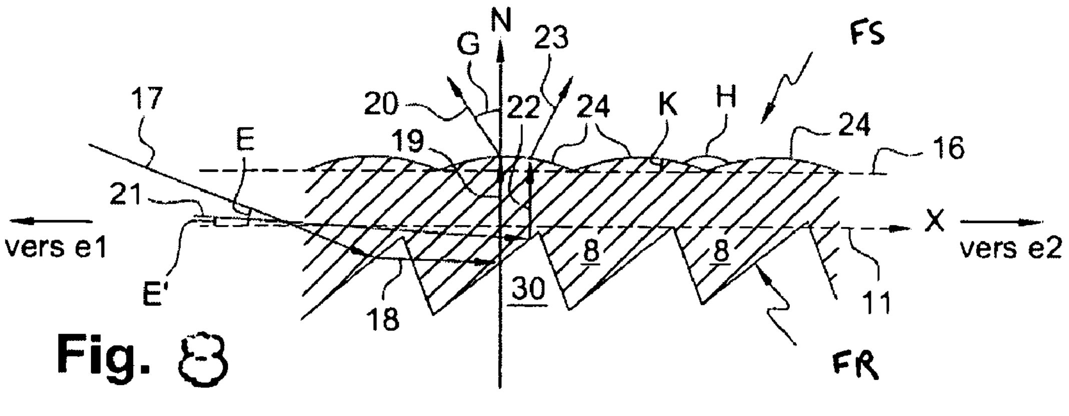
FIG. 8 depicts a second embodiment of an optical guide according to the invention.

FIGS. 7 to 9, corresponding to a second example according to the second implementation, are now described:

A first embodiment of this optical guide according to the invention is depicted in FIG. 7. In this FIG. 7, the reflection face has the reference FR and the output face has the reference FS, with the same conventions as previously.

In the device of the invention, the reflection face FR of the optical guide can be identical/similar to the reflection face of the optical guide described previously. This reflection face is provided with a series of prisms 8 placed one following another so as to form a face with a serrated profile. The prisms 8 can be identical and symmetrical to one another, as in the prior art, or else identical and asymmetrical or else different from one another.

In the case where the prisms 8 are asymmetrical, as shown in FIG. 7, a reflection is obtained at an angle of approximately 90° with respect to the axis X for light rays having an angle of incidence of the order of 10° to 40° with respect to the axis X of the optical guide. This is because, in this case, what can be considered as an air prism 30 is formed by the prism bottom preceding the prism 8 made of transparent material; this air prism 30 provides a straightening of the incident light ray. In other words, if it is considered that the reflection face of the optical guide comprises prisms made of transparent material 8 interspersed by air prisms 30, then these air prisms 30 modify the path of the light rays by straightening the light rays before they encounter a prism made of transparent material 8. For example, FIG. 7 depicts a light ray with path 17 set with an angle of incidence E between 10° and 40° with respect to the axis X of the optical guide. This light ray 17 is deviated and straightened along a path 18 by the air prism 30 before being reflected by the facet 10 of the prism 8. It is then redirected, along the path 19, towards the output face FS of the optical guide along a preferential direction in the main perpendicular to the axis X of the guide.

Another example of a light ray has been depicted in FIG. 7. This light ray, with path 21, has an angle of incidence E' of approximately 5° with respect to the axis X of the optical guide. This light ray is therefore situated in the configuration of total reflection by the prism made of transparent material 8. This ray 21 is therefore reflected, by the facet 10 of the prism 8, at an angle of approximately 90° with respect to the axis X towards the output face FS of the optical guide. In the case of a light ray having an angle of incidence close to the tangent, that is to say between 0° and 5° with respect to the axis, X, then the asymmetrical prisms have the same effect on the light ray as symmetrical prisms. On the other hand, as seen above, the asymmetrical prisms have a straightening effect, in addition to the reflecting effect, when the light ray has an angle of incidence of 10° to 40°. The asymmetrical prisms therefore make it possible to increase the light throughput towards the output face 6 of the optical guide.

In accordance with the invention, the output face FS of the optical guide has a fluted profile. In other words, the output face FS comprises flutes which make it possible to further straighten the light rays at the output of the optical guide. These flutes are contours (humps or hollows) implemented in the output face 6 of the optical guide. They can have different shapes.

In the embodiment of FIG. 7, these flutes 24 each have the shape of a prism, that is to say each flute 24 comprises two plane facets 25 and 26. A facet 26 of one flute and a facet 25 of a consecutive flute together form a bottom angle H of approximately 90°. The facet 25 of a flute 24 forms, with the axis X of the optical guide, a flute angle K of the order of 100 to 20°. Thus, as shown in FIGS. 7 and 8, the flutes 24 of the output face FS have a smaller depth than the prisms 8 of the reflection face FR, in order that the optical guide retains its guidance characteristics. Just like the prisms of the reflection face FR which form a prism bottom line 11, the flutes form a flute bottom line 16. In other words, the bottom of each flute 24 (as opposed to the vertex of the flutes) forms, with the bottom of the consecutive flutes, a curve referred to as the flute bottom line 16. The flutes 24 are therefore contained between the bottom line 16 and a curve connecting the vertex of all the flutes 24, these two curves in the main following the profile of the guide.

These prism-shaped flutes can be symmetrical or, on the contrary, asymmetrical as shown in FIG. 7.

In a first variant, all the flutes of the same optical guide are identical. In a second variant, the flutes are different, that is to say they have a flute angle K and/or a bottom angle H which can vary between the end e1 of the guide and the end e2, so as to allow an adaptive reflection of the light rays over the entire length of the guide.

Whatever their shape, each flute 24 of the output face FS is situated opposite a prism 8 of the reflection face FR. The flutes 24 of the output face FS therefore have a pitch identical to the pitch of the prisms 8 of the reflection face FR. In other words, in order to be effective, the active areas of the output face FS, that is to say the facets 25 of the flutes 24, are situated facing (at least partially opposite) active areas of the prisms 8 of the reflection face FR, that is to say facets 10 of the prisms 8.

Thus, in the example of FIG. 7, the light ray with incoming path 17 undergoes, as explained previously, a first reflection by the facet 10 of a prism 8. It is then refracted by the facet 25 of a flute 24 and leaves the optical guide with a negative angle G with respect to the normal N to the axis X. Similarly, the light ray 21 undergoes the same journey from the facet 10 of the prism. The output angle G thus obtained depends of course on the slope of the flute 24. In the example of FIG. 3, this output angle G is of the order of −20° with respect to the normal N.

This embodiment of the output face as prisms therefore makes it possible to send light rays in a direction impossible to achieve by total reflection on the prisms of the reflection face when the output face is smooth. It makes it possible to obtain a negative angle G of approximately −25° with respect to the normal N.

According to FIG. 7, the angle between the mean direction of propagation in the optical guide and the mean direction of output of the light ray outside the optical guide is obtuse: such an angle cannot be obtained with a smooth output face. FIG. 8 depicts another embodiment of the output face FS of the optical guide of the invention. In this embodiment, the flutes 24 do not a comprise plane facets; on the contrary, the flutes 24 have a curved profile. More precisely, according to a sectional view, each flute 24 has a shape in an arc of a circle.

In other words, each flute 24 forms a kind of dome forming, with the consecutive flute, a bottom angle H. The tangent at the base of the dome makes an angle K of 10° to 20° with respect to the axis X of the optical guide.

Each flute 24 of the output face FS is situated opposite a prism 8 of the reflection face FR. The flutes 24 therefore have a pitch identical to the pitch of the prisms 8 of the reflection face FR. In other words, the flutes 24 of the output face FS are situated opposite active areas of the prisms 8 of the reflection face FR.

This embodiment has the advantage of allowing a controlled distribution of the light around the normal N, which makes it possible to homogenise the appearance of the guide to an external observer. For this, two examples of light rays have been depicted in FIG. 8, which can have different directions at the output of the optical guide.

The first example of a light ray is the light ray with incoming path 17 having an angle of incidence E of 10° to 40° with respect to the axis X. This light ray is first of all deviated by an air prism 30 and then reflected by approximately 90° by a prism 8 towards the output face FS. When it encounters a flute 24 of the output face FS, said light ray undergoes refraction by a negative angle G with respect to the normal N (path 20).

The second example of a light ray is the ray with incoming path 21 having an angle of incidence E' with the axis X. This light ray 21 undergoes a first reflection by a prism 8 of the reflection face FR. When it encounters a flute 24 of the output face 6, said light ray 21 undergoes refraction with a positive angle G with respect to the normal N (path 23). This domed profile of the output face FS therefore makes it possible to distribute the light laterally in several directions.

Figure 9A:
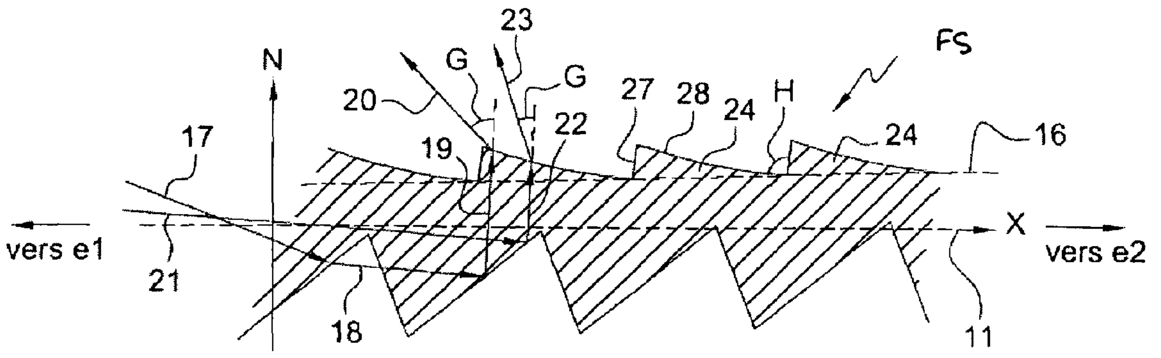
FIGS. 9A and 9B depict a third embodiment of an optical guide according to the invention.

FIG. 9A depicts a third embodiment of the output face of the optical guide of the invention. In this embodiment, the flutes 24 of the output face FS form prisms with a curved facet. More precisely, each flute 24 comprises a curved facet 28 and a plane facet 27, each curved facet 28 being consecutive to a plane facet 27. The curved facet 28 and the plane facet 27 of a consecutive flute together form a bottom angle H of the order of 90°. The tangent to the curved facet 28 forms, with the axis X of the optical guide, a flute angle K of the order of 10° to 20°. In this embodiment, the flutes are contiguous with one another, that is to say one flute is side by side with the next flute. This third embodiment combines characteristics of the first embodiment with characteristics of the second embodiment, which makes it possible to optimise the guidance of the light rays through the optical guide, whilst guaranteeing good homogeneity of the light and sending of the light in directions which are inaccessible conventionally.

As shown in FIG. 9A, the first example of a light ray 17 is refracted, by a flute 24 of the output face 6, with a negative angle G with respect to the normal N. The second example of a light ray 21 leaves the optical guide with a negative angle G with respect to the normal N, different from the angle G formed by the light ray 20. However, as can be seen in FIG. 9A, depending on the location on the flute, the value of the output angle G differs. It can therefore be understood that the output angle G varies depending on the location, on the facet 28 of the flute 24, of the point of contact of the light ray with the flute. In other words, the value of the output angle depends on the radius of curvature of the curved facet 28. Thus, by modifying the curvature of the curved facets 28 of the flutes 24, it is possible to obtain a whole range of output angles. In other words, such an output face with curved prisms makes it possible to obtain both a prism effect and an effect of scattering of the light beam.

Figure 9B:
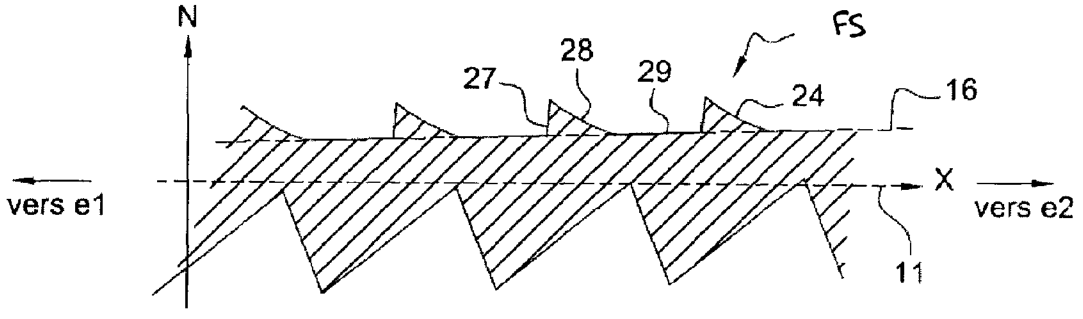

FIG. 9B depicts a variant of the embodiment of FIG. 9A. In this variant, the flutes 24 of the output face FS form non-contiguous prisms with a curved facet. More precisely, each flute 24 comprises a curved facet 28 and a plane facet 27, each curved facet 28 being separated from the plane facet 27 of the following flute by a flat surface 29. The flutes 24 are therefore separated from one another by flat surfaces 29. In this variant, the active area of each flute 24, that is to say the curved facet 28, is placed opposite (at least partially) the active area of the prism 8, that is to say the facet 10 of the prism, in order to make the refraction by the flutes as efficient as possible. In this variant, the flat surface 29 makes it possible to propagate the end e2, the light rays non-refracted by the flutes 24.

Figure 6:
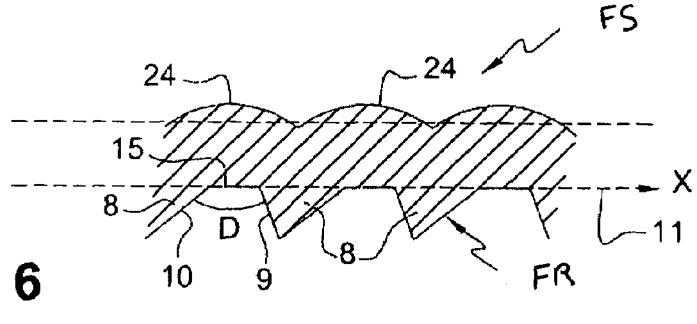
FIG. 6 depicts a sectional view of an optical guide according to the invention where the output face of the guide is fluted.

FIG. 6 depicts a light guide, according to a third embodiment, which is modified on both its output face and its reflection face in accordance with the invention: the output face 6 comprises flutes which make it possible to straighten the light rays at the output of the optical guide, that is to say to make them leave the optical guide with a negative angle with respect to the normal N to the axis X of the guide, as depicted in FIG. 8, and the reflection face comprises prisms such as those described with the help of FIG. 4 in particular. Combining the two implementations of the invention on the same light guide is highly advantageous.

The flutes of the output face FS can have various shapes, for example, be in the shape of prisms or domes or else a combination of prisms and domes, as seen above with FIGS. 7 and 8. They are situated opposite active areas of the prisms 8 of the reflection face.

The prisms of the reflection face can be those described in FIG. 3, 4 or 5. The presence of flat surfaces 15 in the optical guide allows a light ray to propagate in the optical guide without touching one of the facets 9 or 10 of the prisms 8 of the reflection face FR. Therefore, the light ray is reflected towards the output face of the optical guide further in the guide, which makes it possible to distribute the light flux uniformly between the ends e1 and e2 of the optical guide.

It should be noted that the examples described above, and, more generally, the light guides according to the invention, have preferably circular cross-sections, since such a cross-section is the most appropriate in terms of optical guidance. This cross-section is moreover highly appropriate in terms of focusing the light. But the invention also concerns light guides of different cross-section, for example a cross-section of conical shape, for example of elliptic, hyperbolic or parabolic, at least partially, or oval shape. Cross-sections of the parallelogram, square, or rectangle type are also possible but less advantageous in terms of light guidance.

It should also be noted that, both for the flutes of the output face and for the prisms of the reflection face, the flutes and/or the prisms can have variable widths (that is to say affect to a greater or lesser degree the width of the face in question, either entirely or partially, in a constant manner, or with a width which is variable over the length of the guide).

The invention therefore proposes two light guide implementations, alternative or combined, in order to have better visual homogeneity of the guide once illuminated and/or to have more control over the orientation of the light emitted by the light guide. Combining the two implementations is highly advantageous, since they work towards the same aim: that of improving the visual appearance of the light guides once illuminated.

The invention claimed is:

1. A device for a motor vehicle comprising:

at least one light source in a motor vehicle signal light or headlight configured to emit a light beam and at least one optical guide in which the light beam propagates, said optical guide comprising:

an output face for the light beam comprising flutes of uniform size and shape, and a reflection face, opposite to the output face, having a serrated profile forming a reflection face for the light beam;

wherein the reflection face comprises a series of prisms, each prism forming, with the following prism, a bottom angle, said at least one bottom angle of the reflection face being truncated, the size of the truncated area being variable from one angle to another.

2. The device of claim 1, wherein the size of the truncated areas of the reflection face decreases as the distance from the light source increases.

3. The device of claim 1, wherein the reflection face comprises both prisms with a truncated bottom angle and prisms with a non truncated bottom angle.

4. The device of claim 1, wherein the prisms of the reflection face have variable pitches and a constant height.

5. The device of claim 1, wherein the prism of the reflection face have a constant pitch and variable heights.

6. The device of claim 4, wherein the pitch of the prisms of the reflection faced has a size less than or equal to 2.5 millimeters, in particular of the order of 0.2 to 2 millimeters.

7. The device of claim 4, wherein the height of the prisms of the reflection face is less than or equal to 2.5 millimeters, in particular of the order of 0.2 to 2 millimeters.

8. The device of claim 1, wherein the prisms of the reflection face are symmetrical.

9. The device of claim 1, wherein the prisms of the reflection face are dissymmetrical.

10. The device of claim 1, wherein each flute of the output face is situated opposite a prism of the reflection face.

11. The device of claim 1, wherein it comprises at least two light sources each placed at one end of the optical guide.

12. The device of claim 1, wherein it comprises several optical guides having a common intersection, at least one light source being situated at this intersection point.

13. The device of claim 5, wherein the pitch of the prisms of the reflection face has a size less than or equal to 2.5 millimeters, in particular of the order of 0.2 to 2 millimeters.

14. A device for a motor vehicle comprising:

at least one light source in a motor vehicle signal light or headlight configured to emit a light beam and at least one optical guide in which the light beam propagates, said optical guide comprising:

a substantially cylindrical cross-section and a curvilinear shape along its length;

an output face for the light beam, and a reflection face, opposite to the output face, having a serrated profile made up of a plurality of prisms having planar facets forming a reflection face for the light beam;

wherein the output face has a profile comprising flutes of uniform shape and size.

15. The device of claim 14, wherein the flutes have a curved shape, in particular in an arc of a circle.

16. The device of claim 14, wherein the flutes have the shape of a prism, in particular with plane facets.

17. The device of claim 16, wherein the prisms of the output face are symmetrical or dissymmetrical.

18. The device of claim 14, wherein the flutes of the output face each comprise a curved facet and a plane facet.

19. The device of claim 14, wherein the flutes of the output face are contiguous or non-contiguous.

20. The device of claim 14, wherein each flute of the output face forms a flute angle with an axis of the optical guide, of the order of 1° to 30°.

21. A device for a motor vehicle comprising:

at least one light source in a motor vehicle signal light or headlight configured to emit a light beam and at least one optical guide in which the light beam propagates, said optical guide comprising:

a substantially cylindrical cross-section and a curvilinear shape along its length;

an output face for the light beam, and a reflection face, opposite to the output face, having a serrated profile forming a reflection face for the light beam;

wherein the reflection face comprises a series of prisms, each prism forming, with the following prism, a bottom angle, said at least one bottom angle of the reflection face being truncated, and further wherein the output face has a profile comprising flutes of uniform shape and size.

* * * * *